June 8, 1948.  J. P. GLASS  2,443,104
INDUCTION MOTOR

Filed June 11, 1946  2 Sheets-Sheet 1

INVENTOR
JOHN P. GLASS
BY
ATTORNEY

June 8, 1948.  J. P. GLASS  2,443,104
INDUCTION MOTOR

Filed June 11, 1946  2 Sheets-Sheet 2

INVENTOR
JOHN P. GLASS
BY *Victor D. Borst*
ATTORNEY

Patented June 8, 1948

2,443,104

UNITED STATES PATENT OFFICE 2,443,104

INDUCTION MOTOR

John P. Glass, West New York, N. J., assignor, by mesne assignments, to Kearfott Company, Inc., New York, N. Y., a corporation of New York Application June 11, 1946, Serial No. 675,866

3 Claims. (Cl. 172—280)

This invention relates to induction motors and more particularly to small reversible motors of the follow-up type and has for an object to provide a small, simple, compact and dependable motor of the above type.

Another object is to provide a motor of the above type having novel and improved details of construction and features of operation.

Various other objects and advantages will be apparent as the nature of the invention is more fully disclosed.

This invention is applicable to polyphase control motors for servo control mechanisms. Such control motors are required to satisfy certain specifications for quick, well damped response. Since power efficiency is a less important consideration and in control use a motor having an efficient rotor tends to continue running as a single phase motor when the controlling voltage is removed and because maximum torque is desired at speeds near stalling, motors designed for this service have unusually high rotor resistance. Since the tendency to hunt or oscillate is dependent on the inertia of the moving parts which in a geared system is a function almost entirely of the rotor inertia, motors for control use are further designed for a minimum ratio of rotor inertia to power output. This results in designs having very small rotors which are made longer as power requirements demand and are sometimes called "low inertia motors." When it is desired to utilize a very small power output in order to reduce amplifier size, weight and cost and because greater power is not needed, it becomes necessary to make the smallest possible motor. The present invention provides a novel and improved construction which permits control motors to be made extremely small and compact and reduces their inertia to a minimum.

In accordance with the present invention the stator pole pieces are formed in a housing of magnetic material and are so arranged that the poles are excited by preformed coils which are disposed in the housing itself instead of on the individual pole pieces. The coils carrying the two phases of the exciting voltage are arranged to avoid inter-coupling so that when one phase is deenergized no torque will be produced. This is an important feature because in a follow-up motor one phase is constantly energized and the control signal is supplied to the second phase winding which may be tuned. If coupling is present the tuned winding might have shading pole characteristics and cause the motor to drift. The present invention eliminates this difficulty without introducing additional pole pieces for the second winding.

Although the novel features which are believed to be characteristic of this invention are pointed out more particularly in the claims, the nature of the invention will be better understood by referring to the following description, taken in connection with the accompanying drawings in which a specific embodiment has been set forth for purposes of illustration.

Figure 1:
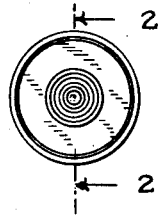
Fig. 1 is a full size end elevation of a motor embodying the present invention.
Figure 2:
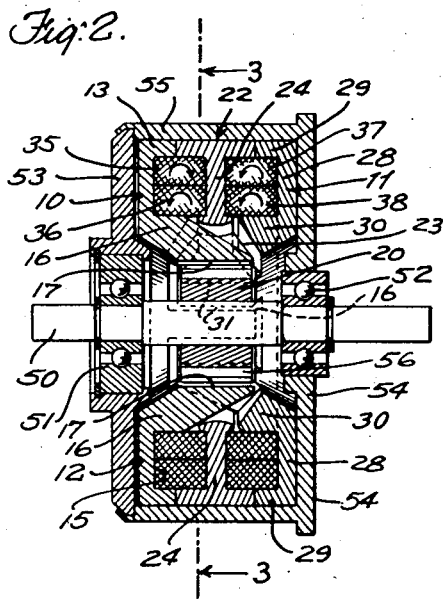
Fig. 2 is an axial section on an enlarged scale taken on the line 2—2 of Fig. 1.
Figure 4:
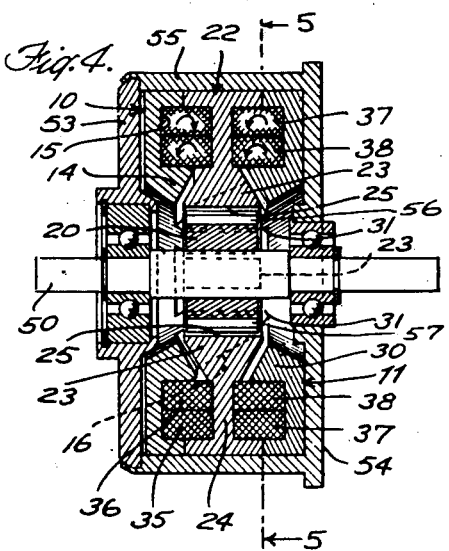
Fig. 4 is an axial section taken on the line 4—4 of Fig. 3.
Figure 3:
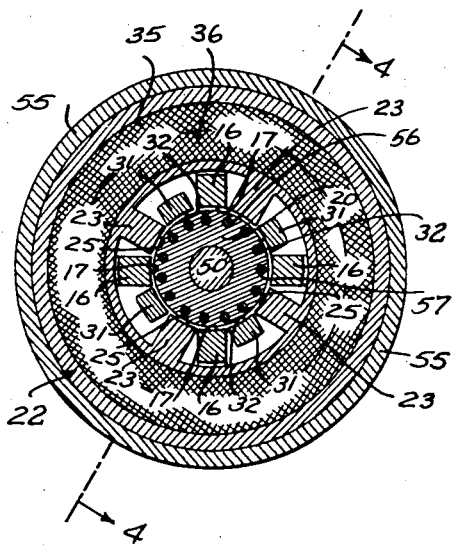
Fig. 3 is a transverse section taken on the line 3—3 of Fig. 2.
Figure 5:
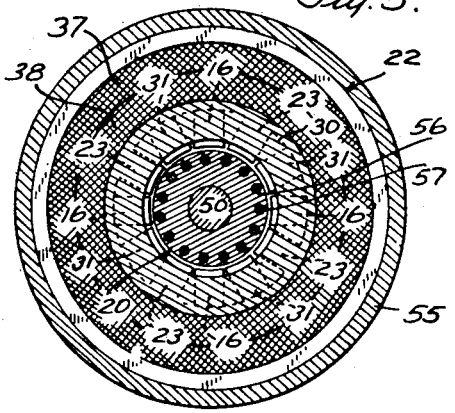
Fig. 5 is a transverse section taken on the line 5—5 of Fig. 4.
Figure 6:
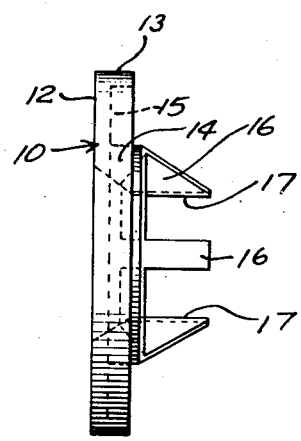
Fig. 6 is a side elevation of one of the end plates.
Figure 7:
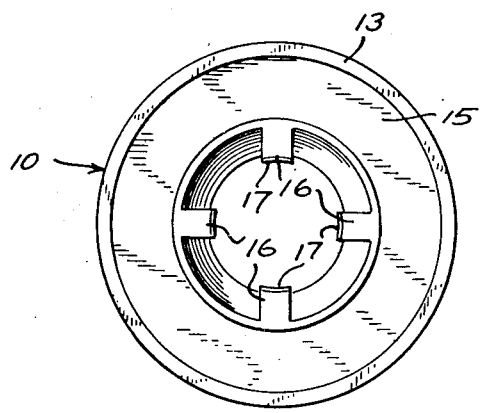
Fig. 7 is a front elevation thereof.
Figure 8:
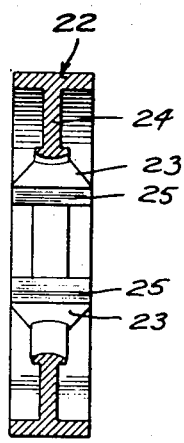
Fig. 8 is a side elevation of the central ring showing the pole pieces carried thereby.
Figure 9:
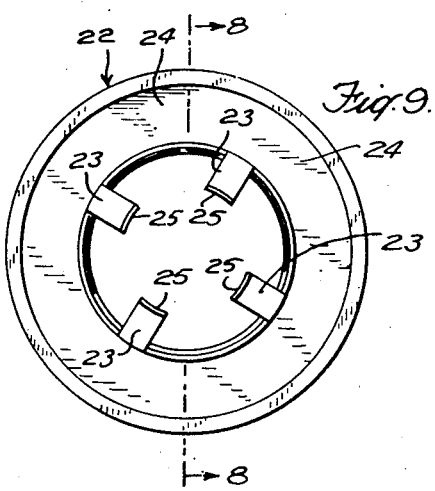
Fig. 9 is a front elevation thereof.

Referring to the drawings more in detail, the motor is shown as comprising a pair of end plates 10 and 11 one of which is shown in detail in Figs. 6 and 7 as including an annular radially extending ring 12 of magnetic material having an outer axial flange 13 and an inner axial flange 14 forming an annular channel 15 therebetween. A set of tapered pole pieces 16 extend axially from the flange 14 and terminate in pole faces 17 positioned adjacent the cylindrical surface of a rotor 20 to be described.

A central ring 22 of magnetic material (Figs. 2, 4, 8 and 9) registers with the outer flanges 13 and carries central radial flange 24 from which a set of pole pieces 23 extend radially inward terminating in pole faces 25.

The end plate 11 is similar to the plate 10 and comprises a ring 28 having an outer axial flange 29 and an inner axial flange 30 with pole pieces 31 projecting axially from the flange 30 and terminating in pole faces 32.

In the form shown there are four pole pieces 16 spaced 90° apart around the end plate 10. The four pole pieces 31 are disposed between the pole pieces 16 and displaced by 60° from the pole pieces 16 and the ring 22 is provided with four pole pieces 23 which are displaced by 30° from the pole pieces 16 and are disposed in the spaces between adjacent pole pieces 16 and 31. The twelve pole faces 17, 32 and 25 define a cylindrical space in which the rotor 20 runs.

Figure 10:
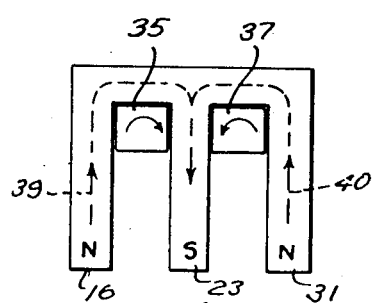
Figs. 10 and 11 are diagrammatic views illustrating the paths of the flux due to the various coils.

In the annular channel defined by the ring 12, flange 13, ring 22 and flange 24 are disposed a pair of annular coils 35 and 36. Annular coils 37 and 38 are disposed in the annular channel defined by the flange 24, ring 22, flange 29 and ring 28. The coils 35 and 37 are connected in series opposition to one phase of the supply line as indicated in Fig. 10 so that the flux induced in the surrounding magnetic path extends clockwise around the coil 35 and counterclockwise around the coil 37 or vice versa as indicated by the dotted lines 39 and 40 of Fig. 10. This causes the outer pole pieces 16 and 31 to have the same polarity and the inner pole piece 23 to have the opposite polarity.

Figure 11:
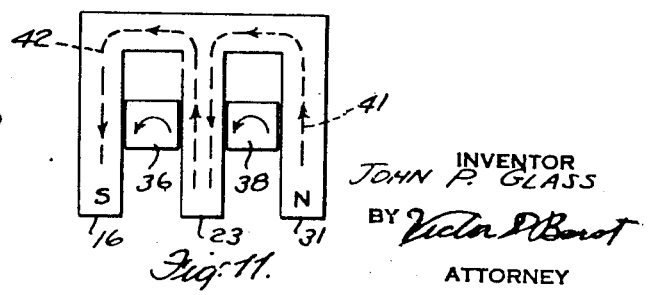

The coils 36 and 38 are connected in series in a like sense as indicated in Fig. 11 to the second phase of the supply line so that the induced flux extends in the same direction around both coils as indicated by dotted lines 41 and 42 in Fig. 11. This flux causes the two outer pole pieces 16 and 31 to have opposite polarities and causes the flux in the middle pole piece to cancel out giving the effect of a flux path direct from one outer pole piece to the other.

A squirrel cage rotor 20 is mounted on a shaft 50 which is journalled in bearings 51 and 52 in end plates 53 and 54 respectively. The end plates 53 and 54 are secured to a ring 55 to form an enclosing housing which holds the parts in position.

The rotor 20 is provided with slots 56 in which conductors 57 are mounted with their ends joined in the usual manner to form a squirrel cage winding.

It will be noted that there is no coupling between the coils 35—37 and the coils 36—38 due to the reverse connection of the former coils. Hence they can be excited from separate sources without interaction even when one of the sets of coils forms a part of a tuned circuit.

When the two sets of coils are supplied by currents having a 90° phase displacement a rotating field is set up which acts on the rotor winding in the usual manner to cause the rotor to rotate in a direction which is determined by the relative phase displacement.

The above construction simplifies the coil forming and assembly as it avoids distributed windings and also provides magnetic members which may be readily formed and assembled. The coils are designed to reduce the copper loss to a minimum and thereby provide high efficiency.

Copper loss is reduced because the coils are of minimum length per turn per pole and the available space permits use of wire of larger cross-section. The cost is also reduced due to ease of assembly and use of machine wound coils. The coils may be completely wound and formed and the magnetic structure assembled around the coils. The magnetic structure may be made from castings or punchings and may take various forms. For example, the peripheral ring portion may be omitted, in which case the groups of pole pieces will be spaced around the rotor and magnetically independent. When coupling is not important, two coils may be used, one in each of the annular coil receiving spaces. For example, one coil may occupy the space of the coils 35 and 36 and the second coil may occupy the space of the coils 37 and 38. In any case it will be noted that the field coils have these axes parallel to the axis of the rotor and the path of the flux includes an axial component.

Although a specific embodiment has been shown for purposes of illustration, it is to be understood that the invention is capable of various uses and that changes and adaptations may be made therein as will be apparent to a person skilled in the art. The invention is only to be limited in accordance with the following claims.

What is claimed is:

1. A polyphase induction motor comprising a rotor and a stator, said stator having a peripheral member and three axially spaced radial members forming a pair of annular channels therebetween separated by the central radial member, a pair of magnetizing coils in each channel, one coil of each channel being connected in series aiding relationship to a coil in the second channel and the other coils in the respective channels being connected in series opposition to eliminate inductive coupling therebetween, and a set of pole pieces extending radially inward from each radial member, the pole pieces of the three members being alternately disposed about said rotor.

2. A polyphase induction motor comprising a rotor and a stator, said stator having a peripheral member and three axially spaced radial members forming a pair of annular channels therebetween separated by the central radial member, a pair of magnetizing coils in each channel, one coil of each channel being connected in series aiding relationship to a coil in the second channel and the other coils in the respective channels being connected in series opposition to eliminate inductive coupling therebetween, and a set of pole pieces extending radially inward from each radial member and terminating in pole faces disposed around the periphery of said rotor, the pole faces of the three radial members alternating around said rotor.

3. A polyphase induction motor comprising a rotor and a stator, said stator having a continuous peripheral member and a plurality of continuous radial flanges axially spaced to form a pair of annular channels therebetween, a pair of magnetizing windings in each channel, one winding of each pair being connected together in series opposition and the other winding of each pair being connected together in series aiding relationship to neutralize any induction coupling between the pairs of windings, and a set of pole pieces extending from each flange, the pole pieces of said sets alternating around the periphery of said rotor and lying in the same transverse plane and being axially co-extensive with said rotor.

JOHN P. GLASS.

REFERENCES CITED

The following references are of record in the file of this patent:

UNITED STATES PATENTS

| Number | Name | Date |
|---|---|---|
| 630,333 | Dietrich | Aug. 8, 1899 |
| 1,440,729 | French | Jan. 2, 1923 |
| 1,984,929 | Janzen | Dec. 18, 1934 |
| 2,070,447 | Morrill | Feb. 9, 1937 |

FOREIGN PATENTS

| Number | Country | Date |
|---|---|---|
| 175,995 | Great Britain | Mar. 29, 1933 |